Nov. 28, 1939.  V. W. KLIESRATH  2,181,732
BRAKE
Filed May 11, 1938
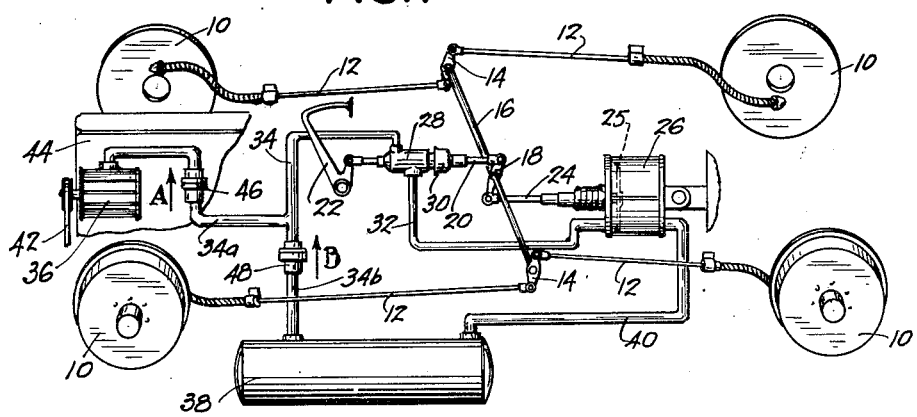
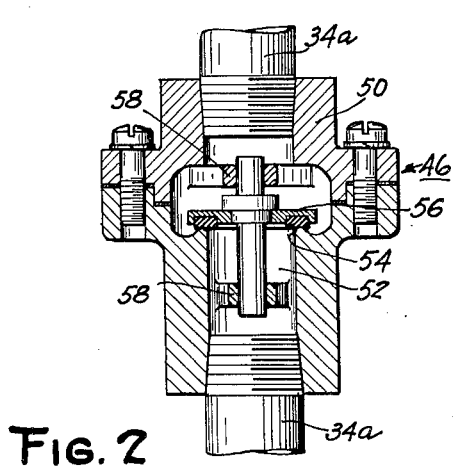
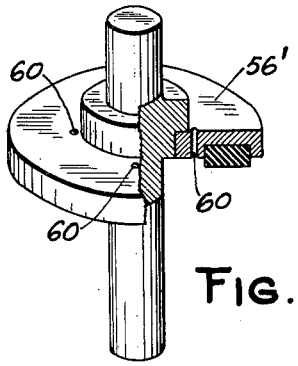
INVENTOR.
VICTOR W. KLIESRATH.
BY Jerome D. Cox.
ATTORNEY.

Patented Nov. 28, 1939

2,181,732

UNITED STATES PATENT OFFICE 2,181,732

BRAKE

Victor W. Kliesrath, South Bend, Ind., assignor to Bendix Products Corporation, South Bend, Ind., a corporation of Indiana Application May 11, 1938, Serial No. 207,206

8 Claims. (Cl. 188—152)

This invention relates to vacuum operated devices on vehicles and has particular relation to a system employing a vacuum pump instead of the usual intake manifold of an internal combustion engine.

This system is particularly suitable for use on Diesel engine driven vehicles due to the fact that Diesel engines usually do not have vacuum in the induction system. In some instances, it might be used in a vehicle driven by an Otto cycle engine; e. g. when the engine is supercharged.

An object of the invention is to provide such a system with a reserve tank and with means for substantially preserving the vacuum stored in such tank for use when the engine is not running.

Another object is to provide in such a system, means requiring the vacuum pump to do substantially all the work while it is operating and to provide a reserve tank operable to do the work when the vacuum pump is not operating.

The above and other objects and desirable particular arrangements of parts will become apparent upon reference to the following detailed description of one embodiment of my invention shown in the accompanying drawing, in which:

Figure 1 is a diagrammatic view of my novel system arranged to apply the brakes of a motor vehicle;

Figure 2 is a longitudinal section of the check valve; and

Figure 3 is a perspective view of the valve member of the check valve modified to permit restricted flow in the direction in which the check valve is closed.

Referring to the figures, there are shown four wheel brakes 10 of the type employed in motor vehicles having applying cables 12 connected to cross arms 14 of a cross shaft 16 so that the brakes are applied by the rotation of the cross shaft.

The cross shaft 16 is provided with an additional cross arm 18 having one end connected by a brake rod 20 to a brake pedal 22 and having its other end connected to the piston rod 24 and piston 25 of a vacuum power cylinder 26.

The brake rod 20 has connected thereinto to be operated by tension therein, a control valve 28 which is operable substantially in the manner of an ordinary three-way valve to admit air through an air cleaner 30 to a controlled pressure line 32 when the pedal is depressed, or to cut off the air and admit vacuum from a vacuum line 34 to the said controlled pressure line when the brake is released. Where connected to the valve 28 the conduits 32 and 34 are formed of flexible hose to permit movement of the valve 28.

The controlled pressure line extends to the forward head of the power cylinder 26 and the vacuum line 34 is connected by a branch 34a to a vacuum pump 36 and by a branch 34b to a reserve tank 38. The reserve tank is connected by a conduit 40 to the rearward end of the power cylinder 26.

The vacuum pump may be driven in any convenient manner; e. g. by the fan belt 42 of the vehicle driving motor 44.

In the vacuum conduit 34a, I provide a check valve 46 opening in the direction of the arrow A or any other suitable means for preventing air from entering the conduit from the pumps when it is not operating.

In the conduit 34b, I provide another check valve 48 opening in the direction of the arrow B to permit the pump 36 to evacuate the tank 38.

The check valve 46 may be constructed as shown in Figure 2 in the form of a two-part casing 50 having a passage 52 therethrough connected at its ends to parts of the conduit 34a and having an annular enlargement providing a valve seat 54 against which is seated a valve disk 56. The disk 56 may have a stem slidable in and supported by suitable guides 58 formed integrally with the casing.

The check valve 48 may be similarly constructed with the exception that the valve disk 56' (shown in Figure 3) has a series of passages 60 therethrough permitting a restricted flow of air in the direction in which the valve closes.

In operation, when the engine 44 is started, the vacuum pump 36 evacuates the conduits 34a, 34b, 34 and 32, the forward end of the cylinder 26, the vacuum reserve tank 38, the conduit 40 and the rearward end of the cylinder 26. Consequently no force is exerted on the piston 25 and the brakes are released by their usual return springs.

Now, if it is desired to apply the brakes, the pedal 22 is depressed, putting tension in the brake rod 20 and operating the control valve 28 to interrupt communication between the conduits 34 and 32 and admit air to the conduit 32 as previously described. The pressure of the air on the forward side of the piston 25 moves the piston rearwardly, rotating the cross shaft 16 and applying the brakes 10.

Now, if the pedal 22 is released to permit the release of the brakes, the valve 28 re-establishes communication between the conduits 34 and 32, cutting off the air, and the pump evacuates the air which has been admitted to the conduit 32 and the forward end of the cylinder 26, again equalizing the pressure on the piston and releasing the brakes.

Now, if the vehicle is coasting with the motor stalled, the application of the brakes is the same; i. e. the operation of the pedal 22 shifts the valve 28 to admit air to the conduit 32, but the release operation is now carried on by the reserve tank. Assuming that the pedal 22 has been released so that the valve has shifted to reconnect the conduits 34 and 32, the pump is no longer working to evacuate the air, so the air flows into the reserve tank 38 through the ports 60 in the valve disk 56' of the check valve 48 to gradually equalize the pressure on both sides of the piston 25 and thereby release the brakes. The release operation is substantially slower due to the restriction provided by the small ports 60 but this does not materially interfere with vehicle operation.

The reserve tank 38 is preferably of such size that at least two or three effective brake applications may be made before the pressure therein raises enough to render the power system ineffectual.

When the motor is restarted, vacuum is immediately created by the pump 36 in the conduits 34a, etc., and the check valve 48 opens to permit rapid exhausting of the reserve tank 38 in preparation for its next period of operation.

Thus it will be observed that, as long as the motor 44 is running, the vacuum in the reserve tank is maintained at a maximum because very little air can enter the tank through the restricted ports 60, the balance of the air being rapidly exhausted by the pump.

This serves another purpose, in that it maintains full vacuum on the rear on applying side of the piston 25. Obviously, if on release of the brakes, the air on the forward side of the piston were dumped into the tank a succeeding application would be less powerful until the pump had succeeded in evacuating this air and re-establishing full vacuum.

While one embodiment of the invention has been shown and described in detail, it is not my intention that the scope of the invention should be limited to that embodiment, or otherwise than by the terms of the appended claims.

I claim:

1. In a vacuum operated power actuating system, a source of vacuum, a main vacuum conduit connected thereto, a vacuum motor having one end connected to said main vacuum conduit, a reserve tank, a branch conduit connecting the reserve tank to the vacuum conduit, a second conduit connected to said reserve tank and to the other end of said vacuum motor, and a valve in the branch conduit permitting free flow of air in one direction and restricted flow in the opposite direction.

2. In a vacuum operated power actuating system, a source of vacuum, a main vacuum conduit connected thereto, a vacuum motor having one end connected to said main vacuum conduit, a reserve tank, a branch conduit connecting the reserve tank to the vacuum conduit, a second conduit connected to said reserve tank and to the other end of said vacuum motor, and a valve in the branch conduit permitting free flow of air toward the source of vacuum and restricted flow in the opposite direction.

3. In a vacuum operated power actuating system, a source of vacuum, a main vacuum conduit connected thereto, a vacuum motor having one end connected to said main vacuum conduit, a reserve tank, a branch conduit connecting the reserve tank to the vacuum conduit, a second conduit connected to said reserve tank and to the other end of said vacuum motor, and means in the branch conduit for restricting the flow of air toward the reserve tank.

4. In a vacuum operated power actuating system, a power cylinder, a main source of vacuum, a main conduit connecting one end of the cylinder to the main source of vacuum, a control valve interposed in the conduit, an auxiliary source of vacuum, a branch conduit connecting the auxiliary source of vacuum to the first named conduit, a second conduit connecting the reserve tank to the other end of the cylinder and means restricting the flow of air through said branch conduit toward the auxiliary source of vacuum.

5. In a vacuum operated power actuating system, a power cylinder, a source of vacuum, a main conduit connecting one end of the cylinder to the source of vacuum, a control valve interposed in the conduit, a reserve tank, a second conduit connecting the reserve tank to the other end of the cylinder, a branch conduit connecting the reserve tank to the first named conduit, and means restricting the flow of air through said branch conduit toward the reserve tank.

6. In a vacuum operated power actuating system, a power cylinder, a source of vacuum, a main conduit connecting one end of the cylinder to the source of vacuum, a control valve interposed in the conduit, a manually operated member for operating said control valve, a reserve tank, a second conduit connecting the reserve tank to the other end of the cylinder, a branch conduit connecting the reserve tank to the first named conduit, and a valve in the branch conduit permitting free flow of air from the reserve tank and restricting flow toward the reserve tank.

7. In a vacuum operated power actuating system, a power cylinder, a source of vacuum, a conduit connecting one end of the cylinder to the source of vacuum, a control valve interposed in the conduit, a reserve tank, a branch conduit connecting the reserve tank to the first named conduit, a valve in the branch conduit permitting free flow of air from the reserve tank and restricting flow toward the reserve tank, and a conduit connecting the other end of the cylinder to the reserve tank.

8. In a vacuum operated power actuating system, a vacuum pump, a reserve tank, a power cylinder, a conduit connecting one end of the power cylinder to the vacuum pump, a conduit connecting the other end of the cylinder to the reserve tank, a control valve in the first named conduit, a branch conduit connecting the first named conduit to the reserve tank, and valve means in the last named conduit permitting free flow of air from the reserve tank and restricting flow of air toward the reserve tank.

VICTOR W. KLIESRATH.